United States Patent [19]

Chu

[11] Patent Number: 4,549,956
[45] Date of Patent: Oct. 29, 1985

[54] OCTANE AND TOTAL YIELD IMPROVEMENTS IN CATALYTIC CRACKING

[75] Inventor: Pochen Chu, West Deptford, N.J.

[73] Assignee: Mobil Oil Corporation, New York, N.Y.

[21] Appl. No.: 708,111

[22] Filed: Mar. 5, 1985

Related U.S. Application Data

[63] Continuation of Ser. No. 587,415, Mar. 5, 1984, abandoned, which is a continuation-in-part of Ser. No. 434,442, Oct. 15, 1982, abandoned.

[51] Int. Cl.$^4$ ............................................. C10G 11/05
[52] U.S. Cl. ...................................... 208/120; 208/111; 502/67
[58] Field of Search .................. 208/111, 120; 502/67, 502/68

[56] References Cited

U.S. PATENT DOCUMENTS

| 3,379,640 | 4/1968 | Chen et al. | 208/111 |
| 3,758,402 | 9/1973 | Oleck et al. | 208/111 |
| 3,985,640 | 10/1976 | Lussier et al. | 208/120 |
| 4,260,839 | 4/1981 | Chen et al. | 502/67 |
| 4,309,279 | 1/1982 | Chester et al. | 208/120 |
| 4,309,280 | 1/1982 | Rosinski et al. | 208/120 |
| 4,416,765 | 11/1983 | Chester et al. | 208/120 |

Primary Examiner—D. E. Gantz
Assistant Examiner—O. Chaudhuri
Attorney, Agent, or Firm—Alexander J. McKillop; Michael G. Gilman; Malcolm D. Keen

[57] ABSTRACT

Addition of AgHZSM-5 to conventional cracking catalysts results in a significant increase in gasoline octane without undue loss in gasoline yield. This octane increase is greater than could be achieved by adding HZSM-5.

15 Claims, No Drawings

OCTANE AND TOTAL YIELD IMPROVEMENTS IN CATALYTIC CRACKING

CROSS REFERENCE TO RELATED CASES

This is a continuation of copending application Ser. No. 587,415, filed on Mar. 15, 1984, now abandoned, which is a continuation-in-part of Ser. No. 434,442, filed Oct. 15, 1982, now abandoned.

BACKGROUND OF THE INVENTION

1. Field of the Invention

This invention relates to a novel catalytic cracking process to produce motor fuels. In particular, this invention relates to an improved catalytic cracking process involving the use of an admixture of AgHZSM-5 and a conventional cracking catalyst to increase gasoline octane number and total yield.

2. Description of the Prior Art

Hydrocarbon conversion processes utilizing crystalline zeolites have been the subject of extensive investigation during recent years, as is obvious from both the patent and scientific literature. Crystalline zeolites have been found to be particularly effective for a wide variety of hydrocarbon conversion processes including the catalytic cracking of a gas oil to produce motor fuels and have been described and claimed in many patents, including U.S. Pat. Nos. 3,140,249; 3,140,251; 3,140,252; 3,140,253; and 3,271,418. It is also known in the prior art to incorporate the crystalline zeolite into a matrix for catalytic cracking and such disclosure appears in one or more of the above-identified United States patents.

It is also known that improved results will be obtained with regard to the catalytic cracking of gas oils if a crystalline zeolite having a pore size of less than 7 Angstrom units is included with a crystalline zeolite having a pore size greater than 8 Angstrom units, either with or without a matrix. A disclosure of this type is found in U.S. Pat. No. 3,769,202. Although the incorporation of a crystalline zeolite having a pore size of less than 7 Angstrom units into a catalyst composite comprising a larger pore size crystalline zeolite (pore size greater than 8 Angstrom units) has indeed been very effective with respect to raising of octane number, nevertheless it did so at the expense of the overall yield of gasoline.

Improved results in catalytic cracking with respect to both octane number and overall yield were achieved in U.S. Pat. No. 3,758,403. In said patent, the cracking catalyst was comprised of a large pore size crystalline zeolite (pore size greater than 7 Angstrom units) in admixture with ZSM-5 type zeolite wherein the ratio of ZSM-5 type zeolite to large pore size crystalline zeolite was in the range of 1:10 to 3:1.

The use of ZSM-5 type zeolite in conjunction with a zeolite cracking catalyst of the X or Y faujasite variety is described in U.S. Pat. Nos. 3,894,931; 3,894,933; and 3,894,934. The two former patents disclose the use of ZSM-5 type zeolite in amounts up to and about 5 to 10 weight percent; the latter patent discloses the weight ratio of ZSM-5 type zeolite to large pore size crystalline zeolite within the range of 1:10 to 3:1.

The addition of a separate additive catalyst comprising one or more members of the ZSM-5 type has been found to be extremely efficient as an octane and total yield improver when used in very small amounts in conjunction with a conventional cracking catalyst. Thus, in U.S. Pat. No. 4,309,279, it was found that only 0.1–0.5 weight percent of a ZSM-5 type catalyst added to a conventional cracking catalyst under conventional cracking operations could increase octane by about 1 to 3 RON+0 (research octane number without lead).

It has also become known that incorporation of silver into ZSM-5 improves the steam stability of the catalyst. Thus, under the severe hydrothermal condition often encountered during oxidative regeneration of hydrocarbon conversion catalysts or as a result that one of the products of a conversion process is water, such as during the conversion of methenol to gasoline, the catalyst will maintain catalytic activity and structure crystallinity. However, the improved gasoline selectivity and higher octane achieved with AgHZSM-5 in combination with conventional cracking catalysts as in the present invention is unexpected based on the prior art where addition of a metal function results in very substantial losses in gasoline product with resulting increases in gas make.

In order to reduce automobile exhaust emissions to meet federal and state pollution requirements, many automobile manufacturers have equipped the exhaust system of their vehicles with catalytic converters. Said converters contain catalysts which are poisoned by tetraethyl lead. Since tetraethyl lead has been widely used to boost the octane number of gasoline, refiners now have to turn to alternate means to improve gasoline octane number.

One method of increasing octane number is to raise the cracker reactor temperature. This method, however, is very limited, since many units are now operating at maximum temperatures due to metallurgical limitations. Raising the cracker reactor temperature also results in increased requirements for the gas plant (i.e., gas compressor and separator). Since most gas plants are now operating at maximum capacity, any increase load could not be tolerated by the present equipment.

An alternative method has been to mix an additive catalyst such as ZSM-5 to the cracking catalyst as described above. Generally, the octane gain of a ZSM-5 containing cracking catalyst is associated with gasoline ($C_5+$) yield decrease and correspondingly higher yields of $C_3$ and $C_4$ gaseous products. As the freshly added ZSM-5 undergoes hydrothermal deactivation the octane enhancement is reduced and additional ZSM-5 must be added to maintain the desired octane level.

As can well be appreciated in the foregoing, it would be extremely desirable to have a more steam stable ZSM-5 additive which would in effect reduce the additive catalyst requirement to maintain a given octane level.

SUMMARY OF THE INVENTION

There has now been discovered an improved process to upgrade the octane number and total yield in catalytic cracking units. By admixing an additive catalyst prepared in accordance with the present invention to conventional cracking catalysts, there is a significant improvement in the octane number of the resultant gasoline, without undue sacrifice of gasoline ($C_5+$) yield.

The additive catalyst of this invention comprises a ZSM-5 type zeolite having incorporated therein about 0.05–5 percent by weight silver. The additive catalyst can be introduced to the cracking process at any time and at any point for quick octane improvement. It has been found that for a given ZSM-5 level the octane increase achieved by the process of the present invention is greater than is achieved by cracking processes which involve adding HZSM-5 to conventional cracking catalyst. In other words in a continous process where the catalyst is subject to hydrothermal deactivation less AgHZSM-5 is required to maintain a given octane level than for HZSM-5.

DESCRIPTION OF THE PREFERRED EMBODIMENTS

The addition of a separate additive catalyst comprising one or more members of a ZSM-5 type zeolite having incorporated therein about 0.05 to about 5 wt percent silver is extremely effective as an octane and total yield improver when used in conjunction with a conventional cracking catalyst. It has been found that about 1 to 50 wt percent of the AgZSM-5 catalyst added to the conventional cracking catalyst in the unit under conventional cracking operations can increase octane by about 1 to 6 RON+0 (research octane number without lead). This octane increase is also accompanied by an increase in $C_5+$ gasoline plus alkylate yield as compared to conventional commercial cracking catalysts alone.

The additive catalyst can be injected at any time during the catalytic cracking process. The additive catalyst can be introduced while the cracking unit is down, or while the cracking unit is onstream operation. Once the catalyst is added to the process, the refiner can return to conventional operation or an operation at a lower octane number by eliminating or decreasing the use of additive catalyst. Thus, the increase in octane number over the number obtainable with the conventional cracking operations can be controlled by controlling the amount of additive catalyst.

Catalytic cracking units which are amenable to the process of this invention operate within the temperature range of about 400° to 1300° F. under reduced atmospheric or superatmospheric pressure. The catalytic cracking process may be operated batchwise or continuously. The catalytic cracking process can be either fixed bed, moving bed (TCC) or fluidized bed (FCC) and the hydrocarbon chargestock flow may be either concurrent or countercurrent to the conventional catalyst flow. The process of this invention is particularly applicable to the fluid catalytic cracking (FCC) process.

It is a feature of the present invention that the additive catalyst may be introduced in an FCC process without disrupting the operation of the process. The additive catalyst may be introduced into the process at almost any convenient point. Preferred points of injection are into the regenerator or into the catalyst bed. If present as small size particles, the additive catalyst can be fed directly to the hydrocarbon feed.

The amount of additive catalyst required to increase gasoline octane number is generally based on the total quantity of conventional cracking catalyst in the unit, i.e., on the circulating inventory of conventional cracking catalyst. For example, if the additive catalyst is first introduced via the addition of fresh make-up catalyst, the amount of additive catalyst required would be quite high as compared against the total amount of fresh make-up catalyst added. (The total fresh makeup includes both the conventional cracking catalyst makeup and the fresh Ag HZSM-5 additive catalyst makeup). However, after a period of time of fresh make-up catalyst addition, and once the amount of additive catalyst is maintained at the prescribed limits as compared to the circulating inventory of conventional cracking catalysts, the amount of additive catalysts in the fresh make-up catalyst addition will be much lower than initially. The amount of additive catalyst relative to the amount of conventional cracking catalyst will generally fall within the range of 1–50 wt percent.

After cracking, the resulting product gas is compressed and the resulting products may suitably be separated from the remaining components by conventional means such as adsorption, distillation, etc.

Hydrocarbon chargestocks undergoing cracking in accordance with this invention comprise hydrocarbons generally and, in particular, petroleum fractions having an intial boiling point range of at least 400° F., a 50 percent point range of at least 500° F. and an end point range of at least 600° F. Such hydrocarbon fractions include gas oils, residual oils, cycle stocks, whole top crudes and heavy hydrocarbon fractions derived by the destructive hydrogenation of coal, tar, pitches, asphalts and the like. As will be recognized, the distillation of higher boiling petroleum fractions above 750° F. must be carried out under vacuum in order to avoid thermal cracking. The boiling temperatures utilized herein are expressed in terms of convenience of the boiling point corrected to atmospheric pressure.

The members of the class of the zeolites useful as the additive catalyst are exemplified by ZSM-5, ZSM-11, ZSM-12, ZSM-23, ZSM-35, ZSM-38, ZSM-48 and other similar materials having a Constraint Index in the range of 1–12.

ZSM-5 is more particularly described in U.S. Pat. No. 3,702,886, the entire contents of which are incorporated herein by reference.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-23 is more particularly described in U.S. Pat. No. 4,076,842, the entire contents of which are incorporated herein by reference.

ZSM-35 is more particularly described in U.S. Pat. No. 4,016,245, the entire contents of which are incorporated herein by reference.

ZSM-38 is more particularly described in U.S. Pat. No. 4,046,859, the entire contents of which are incorporated herein by reference.

ZSM-48 is more particularly described in U.S. Pat. No. 4,397,827, the entire contents of which are incorporated herein by reference.

Natural zeolites may sometimes be converted to this class of zeolites by various activation procedures and other treatments such as base exchange, steaming, alumina extraction and calcination, alone or in combinations. Natural minerals which may be so treated include ferrierite, brewsterite, stilbite, dachiaridite, epistilbite, heulandite and clinoptilolite. The preferred zeolites of the additive catalyst are ZSM-5, ZSM-11, ZSM-12, ZSM-23, ZSM-35 and ZSM-38 and ZSM-48, with ZSM-5 particularly preferred.

The AgHZSM-5 catalysts of this invention may be prepared in various ways. Additive catalysts containing the AgHZSM-5 may be separately prepared in the form of particles such as fluid microspheres, pellets or extrudates, for example, and simply mixed in the required proportions with the conventional cracking catalyst. The particle size of the individual component particles may be quite small, for example from about 20 to about 150 microns, when intended for use in fluid bed operation, or they may be as large as up to about ½ inch for fixed bed operation. Alternatively, the AgHZSM-5 component may be mixed with the conventional cracking catalyst and formed into pellets or extrudate, each pellet containing both the AgHZSM-5 and cracking catalyst components in the substantially required proportion.

As is the case of many catalysts, it is desirable to incorporate the zeolite component of the additive catalyst in a matrix. Such matrix is useful as a binder and imparts greater resistance to the catalyst for the severe temperature, pressure and velocity conditions encountered in many cracking processes.

Matrix materials include both synthetic and natural substances. Such substances include clays, silica and/or metal oxides. The latter may be either naturally occurring or in the form of gelatinous precipitates, sols or gels including mixtures of silica and metal oxides. Frequently, zeolite materials have been incorporated into naturally occurring clays, e.g. bentonite and kaolin.

In addition to the foregoing materials, the zeolite for use herein can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of clay in combination with silica or any of the above-specified cogels to form a matrix is highly preferred.

The method of incorporating silver into the ZSM-5 type additive catalyst does not appear to be critical and therefore numerous methods known in the art can be utilized. For example, ion exchange, vapor deposition, or impregnation of either the ZSM-5 alone, the ZSM-5 catalyst particle or the entire cracking catalyst composition (a single pellet of ZSM-5 and cracking catalyst) may be treated with the silver.

Methods of incorporating silver are disclosed in copending application Ser. No. 434,442, filed Oct. 15, 1982, as well as U.S. Pat. No. 4,276,438, the disclosure of both being incorporated by reference.

A recent advance in the art of catalytic cracking is disclosed in U.S. Pat. No. 4,072,600, the entire contents of which are incorporated herein by reference. One embodiment of this aforesaid patent teaches that trace amounts of a metal selected from the group consisting of platinum, palladium, iridium, osmium, rhodium, ruthenium, and rhenium when added to cracking catalysts enhance significantly conversion of carbon monoxide during the catalyst regeneration operation. The additive catalyst of the present invention thus can be used in conjunction with such technology.

Conventional cracking catalysts contain active components which may be zeolitic or non-zeolitic. The non-zeolitic active components are generally amorphous silica-alumina and crystalline silica-alumina. The maximum benefit of this invention is attained when a large pore zeolite such as Y is part of the conventional cracking. The major conventional cracking catalysts presently in use generally comprise a crystalline zeolite having a pore size greater than 8 Angstron Units (active component) in a suitable matrix. Representative crystalline zeolite active component constituents of conventional cracking catalysts include zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), synthetic mordenite and dealuminized synthetic mordenite, merely to name a few, as well as naturally occurring zeolites, including chabazite, faujasite, mordenite, and the like. Preferred crystalline zeolites include the synthetic faujasite zeolites X and Y, with particular preference being accorded zeolite Y including its ultrastable form.

The crystalline zeolite employed as a constituent in the cracking catalyst compositions of the present invention is essentially characterized by a high catalytic activity.

In general, the crystalline zeolites are ordinarily ion exchanged either separately or in the final catalyst with a desired cation to replace alkali metal present in the zeolite as found naturally or as synthetically prepared. The exchange treatment is such as to reduce the alkali metal content of the final catalyst to less than about 1.5 wt percent and preferably less than about 0.5 wt percent. The purpose of ion exchange is to substantially remove alkali metal cations which are known to be deleterious to cracking, as well as to introduce particularly desired catalytic activity by means of the various cations used in the exchange medium. For the cracking operation described herein, preferred cations are hydrogen, ammonium, rare earth and mixtures thereof, with particular preference being accorded rare earth. Ion exchange is suitably accomplished by conventional contact of the zeolite with a suitable salt solution of the desired cation such as, for example, the sulfate, chloride or nitrate.

It is preferred to have the crystalline zeolite of the cracking catalyst in a suitable matrix, since this catalyst form is generally characterized by a high resistance to attrition, high activity and exceptional steam stability. Such catalysts are readily prepared by dispersing the crystalline zeolite in a suitable siliceous sol and gelling the sol by various means. The inorganic oxide which serves as the matrix in which the above crystalline zeolite is distributed includes silica gel or a cogel of silica and a suitable metal oxide. Representative cogels include silica-alumina, silica-magnesia, silica-zirconia, silica-thoria, silica-beryllia, silica-titania, as well as ternary combinations such as silica-alumina-magnesia, silica-alumina-zirconia, and silica-magnesia-zirconia. Preferred cogels include silica-alumina, silica-zirconia or silica-alumina-zirconia. The above gels and cogels will generally comprise a major proportion of silica and a minor proportion of the other aforementioned oxide or oxides. Thus, the silica content of the siliceous gel or cogel matrix will generally fall within the range of 55 to 100 wt percent, preferably 60 to 95 wt percent, and the other metal oxide or oxides content will generally be within the range of 0 to 45 wt percent and preferably 5 to 40 wt percent. In addition to the above, the matrix may also comprise natural or synthetic clays, such as kaolin type clays, montmorillonite, bentonite or halloysite. These clays may be used either alone or in combination with silica or any of the above-specified cogels in matrix formulation.

Where a matrix is used, content of crystalline zeolite, i.e., the amount of the zeolite Y component, is generally between about 5 and about 50 wt percent. Ion exchange of the zeolite to replace its initial alkali metal content can be accomplished either prior to or subsequent to incorporation of the zeolite into the matrix.

The above compositions may be readily processed so as to provide fluid cracking catalysts by spray drying the composite to form microspheroidal particles of suitable size. Alternatively, the composition may be adjusted to suitable concentration and temperature to form bead type catalyst particles suitable for use in moving bed type cracking systems. The catalyst may also be used in various other forms such as those obtained by tabletting, balling or extruding.

The hydrothermal stability of ZSM-5 and other zeolites is improved by silver additive irrespective of the crystallinity size of the zeolite. However, especially good results are achieved where employing a ZSM-5 having a crystallite size of 0.2–10 microns and particularly preferred 0.2–5 microns and particularly preferred 0.3–3 microns.

The following examples will serve to illustrate the invention.

EXAMPLE 1

Four pounds of Na TPA ZSM-5 zeolite (0.02–0.05 micron crystallite size) was calcined at 1000° F. for 3 hours with nitrogen purge. The sodium was then removed from the zeolite by $NH_4NO_3$ exchange to less than 0.02% remaining in the sample. The sample was then calcined in air and exchanged with 0.1N $AgNO_3$ solution (4.8 ml/g) at room temperature for four hours, followed by water wash to Ag+ free and dried at 230° F. The exchanged sample was again calcined in air at 1400° F. for 3 hours. Ag content of the final sample was analyzed to be 1.3% by weight.

Separately, the $SiO_2/Al_2O_3$ gel had been prepared by first slurrying 7.9 parts by weight sodium silicate (28.8 $SiO_2$, 8.9% $Na_2O$) in 38 parts water at a controlled temperature of 50° F. Sufficient concentrated sulfuric acid to neutralized 31% of the $Na_2O$ was then added slowly over a ½ hour period and the temperature was maintained at 50° F. A solution prepared by dissolving 1 part $Al_2(SO_4)_3 \cdot 14H_2O$ (FW=594) in four parts water was then added to the slurry over a ½ hour period while mixing at a temperature of 50° F. The pH of the gel was then adjusted to 4.5 with concentrated sulfuric acid.

The $SiO_2/Al_2O_3$ gel and the AgHZSM-5 were combined in quantities to give a 25% AgHZSM-5 catalyst composition. The gel-zeolite mixture was filtered to remove dissolved salts, reslurried with water and spray dried at 700° F. inlet temperature, 350° F. outlet temperature. The spray dried catalyst was exchanged with a 1% $Al_2(SO_4)_3$ solution to remove any remaining sodium and dried at 250° F.

Na and Ag content of the final product were 0.14% and 0.09%, respectively.

EXAMPLE 2

The Na TPA ZSM-5 zeolite and the $SiO_2/Al_2O_3$ gel of Example 1 were combined in proportions to give a 25% ZSM-5 catalyst composition. The mixture was filtered, reslurried with water and spray dried at 700° F. inlet temperature, 350° F. outlet temperature. The spray dried catalyst was exchanged with a 5% $(NH_4)_2SO_4$ solution and dried at 250° F. The sodium content of the final product was 0.03%.

The ZSM-5 catalysts from Examples 1 and 2 were steamed for 10 hours at 1450° F., 45% steam/55% air, O psig to simulate the deactivation process occurring in the regenerator of a cracking unit and combined with steamed Super-D, a commercially available fluid cracking catalyst manufactured by the Davison Division of W. R. Grace & Co., in proportions to give 2% AgHZSM-5 and HZSM-5, respectively. The ZSM-5 additive/cracking catalyst combinations and the cracking catalyst itself were evaluated in a fixed-fluidized bed cracking unit at 960° F. initial temperature, 24 WHSV $hr^{-1}$, 2.5 cat/oil when cracking Joliet Sour Heavy Gas Oil.

Results from this testing show both a higher gasoline yield and a higher octane with the AgHZSM-5 containing catalyst. In fact, the gasoline yield with the AgHZSM-5 approaches that obtained with the base catalyst, while improving octane by over 3 RON+0 as shown in Table 1.

The ZSM-5 had a crystallite size of 0.02–0.05 microns.

TABLE 1

Comparison[1] of Steamed[2] AgHZSM-5[3] and HZSM-5[3] in Super-D[4] at Constant 2.5 cat/Oil (24 WHSV $Hr^{-1}$)

|  | SUPER-D | +2% AgHZSM-5 | +2% HZSM-5 |
|---|---|---|---|
| Conversion, % Vol | 71.2 | 71.9 | 71.4 |
| $C_5+$ Gasoline, % Vol | 56.9 | 56.3 | 54.8 |
| Total $C_4$, % Vol | 15.9 | 17.0 | 17.8 |
| Dry Gas, % Wt | 7.4 | 7.5 | 7.8 |
| Coke, % Wt | 4.7 | 4.5 | 4.6 |
| N—$C_4$, % Vol | 2.1 | 2.4 | 2.3 |
| I—$C_4$, % Vol | 8.3 | 8.2 | 8.9 |
| $C_4^=$, % Vol | 5.6 | 6.5 | 6.6 |
| $C_3$, % Vol | 3.0 | 2.5 | 2.8 |
| $C_3^=$, % Vol | 6.0 | 6.5 | 6.8 |
| Alkylate, % Vol | 19.3 | 21.6 | 22.2 |
| $C_5^+$ Gasoline + Alkylate, % Vol | 76.2 | 77.9 | 77.0 |
| Outside I—$C_4$, % Vol | 5.0 | 6.6 | 6.2 |
| RON + O, $C_5^+$ Gasoline | 85.6 | 88.7 | 87.5 |
| Ron + O, $C_5^+$ Gasoline + Alkylate | 87.7 | 90.2 | 89.4 |
| LFO, % Wt | 24.1 | 23.7 | 24.2 |
| HFO, % Wt | 7.4 | 7.2 | 7.1 |
| G + D, % Wt | 70.3 | 69.9 | 69.1 |

[1] Fixed-Fluidized Bed Bench Unit, 1.0 minute on-steam Reaction Temperature: 960° F.; Feed: JSHGO
[2] Steamed 10 hrs. 1450° F., 45/55 Steam/air, 0 psig.
[3] 0.02–0.05 micron crystallie size
[4] Steamed 4 hrs., 1400° F., 100% steam, 0 psig.

EXAMPLES 3 AND 4

A slurry containing ZSM-5 (0.2–0.5 micron crystallite size) was combined with a 93/7 $SiO_2/Al_2O_3$ gel in quantities to give a 25% ZSM-5 catalyst compositon. The gel-zelite mixture was filtered, reslurried and spray dried at described in Example 1. The spray dried catalyst was exchanged with a 5% $NH_4SO_4$ solution to remove sodium, the silver impregnate with a 0.075N Ag $NO_3$ solution and finally dried at 250° F. The final product, which contained 25% AgHZSM-5, had Na and Ag contents of 0.01 and 0.20 wt percent, respectively.

For comparison, an additive catalyst was also prepared by the procedure described above (Example 3) but without the silver impregnation step.

The above-described AgHZSM-5 (Example 3) and HZSM-5 (Example 4) additive catalysts were each evaluated in a 0.5 BPD pilot plant unit for cracking gas oil. In both evaluations fresh additive catalyst was added to Equilibrium HEZ-53 base FCC catalyst to an initial fresh ZSM-5 level of 3.5 wt percent with no catalyst added thereafter. The results and operating conditions are given in Table 2 and 3 for the AgHZSM-5 and HZSM-5 additives, respectively.

TABLE 2

AgHZSM-5[1] Distillate Mode Yield Data From 0.5 BPD Pilot Plant Study

Example 3
Base FCC Catalyst: Equilibrium HEZ-53

| Time on stream, hrs | Base Case | | 7 | | 52 | | 76 | | 148 | | 339 | |
|---|---|---|---|---|---|---|---|---|---|---|---|---|
| Operating Conditions: | | | | | | | | | | | | |
| Riser Top Temp, °F. | 940 | | 942 | | 937 | | 939 | | 937 | | 936 | |
| Regen Temp, °F. | 1348 | | 1341 | | 1345 | | 1346 | | 1349 | | 1349 | |
| CFR | 1.5 | | 1.6 | | 1.5 | | 1.5 | | 1.5 | | 1.5 | |
| C/O | 4.5 | | 4.1 | | 4.2 | | 4.2 | | 4.5 | | 4.4 | |
| Conversion (vol %) | 48.8 | | 53.7 | | 52.6 | | 53.7 | | 53.2 | | 52.5 | |
| Product Yields, % | wt | vol | wt | vol | wt | vol | wt | vol | wt | vol | wt | vol |
| H₂S | 1.18 | — | 1.15 | — | 1.17 | — | 1.20 | — | 1.20 | — | 1.23 | — |
| H₂ | 0.13 | — | 0.21 | — | 0.21 | — | 0.21 | — | 0.21 | — | 0.19 | — |
| C₁ | 0.79 | — | 0.78 | — | 0.74 | — | 0.76 | — | 0.78 | — | 0.81 | — |
| C₂ | 1.25 | — | 1.40 | — | 1.22 | — | 1.24 | — | 1.19 | — | 1.25 | — |
| C₃ | 0.68 | 1.24 | 0.93 | 1.70 | 0.85 | 1.54 | 0.84 | 1.53 | 0.78 | 1.43 | 0.73 | 1.33 |
| C₃= | 2.82 | 5.01 | 6.17 | 11.0 | 4.82 | 8.55 | 4.68 | 8.30 | 3.93 | 6.96 | 3.29 | 5.84 |
| i-C₄ | 1.03 | 1.70 | 1.37 | 2.25 | 1.25 | 2.06 | 1.28 | 2.10 | 1.25 | 2.06 | 1.19 | 1.96 |
| n-C₄ | 0.41 | 0.66 | 0.47 | 0.75 | 0.43 | 0.69 | 0.48 | 0.77 | 0.42 | 0.67 | 0.42 | 0.67 |
| C₄= | 4.23 | 6.44 | 7.55 | 11.5 | 6.67 | 10.2 | 6.58 | 10.0 | 5.64 | 8.58 | 4.84 | 7.37 |
| C₅⁺ Gasoline | 30.8 | 38.5 | 27.2 | 34.5 | 28.8 | 36.1 | 30.0 | 37.5 | 30.8 | 38.7 | 32.3 | 40.3 |
| LCO | 47.9 | 48.4 | 43.7 | 43.6 | 44.1 | 44.1 | 44.2 | 44.2 | 44.8 | 45.0 | 44.8 | 45.1 |
| HCO + MCB | 3.08 | 2.81 | 3.03 | 2.69 | 3.74 | 3.33 | 2.35 | 2.08 | 2.07 | 1.85 | 2.72 | 2.41 |
| Coke | 5.68 | — | 6.07 | — | 6.00 | — | 6.16 | — | 6.90 | — | 6.24 | — |
| Total | 100.0 | 104.8 | 100.0 | 108.0 | 100.0 | 106.6 | 100.0 | 106.5 | 100.0 | 105.3 | 100.0 | 105.0 |
| Potential Alkylate | | 19.2 | | 37.5 | | 31.3 | | 30.6 | | 26.0 | | 22.1 |
| Outside i-C₄ Required | | 11.2 | | 23.0 | | 19.0 | | 18.5 | | 15.4 | | 12.9 |
| Potential G + D + A | | 106.1 | | 115.6 | | 111.5 | | 112.3 | | 109.7 | | 107.5 |
| Potential G + A | | 57.7 | | 72.0 | | 67.4 | | 68.1 | | 64.7 | | 62.4 |
| G + D | | 86.9 | | 78.1 | | 80.2 | | 81.7 | | 83.7 | | 85.4 |
| C₅⁺ Gasoline Analysis | | | | | | | | | | | | |
| RON + O | | 92.4 | | 94.7 | | 94.3 | | 94.3 | | 94.0 | | 92.8 |

[1] 0.2-0.5 micron crystallite size

TABLE 3

HZSM-5[1] Distillate Mode Yield Data From 0.5 BPD Pilot Plant Study

Example 4
Base FCC Catalyst: Equilibrium HEZ-53

| Time on stream, hrs | Base Case | | 6 | | 51 | | 74 | | 136 | | 347 | |
|---|---|---|---|---|---|---|---|---|---|---|---|---|
| Operating Conditions: | | | | | | | | | | | | |
| Riser Top Temp, °F. | 940 | | 947 | | 940 | | 939 | | 946 | | 946 | |
| Regen Temp, °F. | 1348 | | 1352 | | 1369 | | 1366 | | 1341 | | 1332 | |
| CFR | 1.5 | | 1.5 | | 1.5 | | 1.5 | | 1.5 | | 1.5 | |
| C/O | 4.5 | | 4.2 | | 4.5 | | 4.4 | | 4.3 | | 4.2 | |
| Conversion (vol %) | 48.8 | | 54.3 | | 54.1 | | 53.6 | | 51.1 | | 49.5 | |
| Product Yields, % | wt | vol | wt | vol | wt | vol | wt | vol | wt | vol | wt | vol |
| H₂S | 1.18 | — | 1.08 | — | 1.19 | — | 1.23 | — | 1.19 | — | 1.17 | — |
| H₂ | 0.13 | — | 0.13 | — | 0.15 | — | 0.16 | — | 0.15 | — | 0.16 | — |
| C₁ | 0.79 | — | 0.75 | — | 0.79 | — | 0.84 | — | 0.80 | — | 0.80 | — |
| C₂ | 1.25 | — | 1.51 | — | 1.26 | — | 1.33 | — | 1.35 | — | 1.33 | — |
| C₃ | 0.68 | 1.24 | 1.02 | 1.87 | 0.82 | 1.50 | 0.85 | 1.55 | 0.80 | 1.45 | 0.73 | 1.33 |
| C₃= | 2.82 | 5.01 | 6.83 | 12.12 | 4.61 | 8.19 | 4.30 | 7.62 | 3.78 | 6.70 | 2.88 | 5.11 |
| i-C₄ | 1.03 | 1.70 | 1.46 | 2.40 | 1.30 | 2.14 | 1.31 | 2.15 | 1.06 | 1.75 | 0.97 | 1.59 |
| n-C₄ | 0.41 | 0.66 | 0.52 | 0.83 | 0.46 | 0.72 | 0.46 | 0.73 | 0.44 | 0.69 | 0.51 | 0.80 |
| C₄= | 4.23 | 6.44 | 8.13 | 12.39 | 6.51 | 9.91 | 6.01 | 9.15 | 5.52 | 8.40 | 4.38 | 6.66 |
| C₅⁺ Gasoline | 30.8 | 38.5 | 26.7 | 33.5 | 30.0 | 37.6 | 30.3 | 37.9 | 30.3 | 37.8 | 31.4 | 39.1 |
| LCO | 47.9 | 48.4 | 35.2 | 35.5 | 44.1 | 44.2 | 44.1 | 44.2 | 45.8 | 46.1 | 47.7 | 48.2 |
| HCO + MCB | 3.08 | 2.81 | 11.3 | 10.2 | 1.92 | 1.78 | 2.46 | 2.18 | 3.15 | 2.87 | 2.52 | 2.27 |
| Coke | 5.68 | — | 5.38 | — | 6.94 | — | 6.68 | — | 5.68 | — | 5.43 | — |
| Total | 100.0 | 104.8 | 100.0 | 108.8 | 100.0 | 106.6 | 100.0 | 105.5 | 100.0 | 105.4 | 100.0 | 105.1 |
| Potential Alkylate | | 19.2 | | 40.9 | | 30.3 | | 28.0 | | 25.3 | | 19.7 |
| Outside i-C₄ Required | | 11.2 | | 25.2 | | 18.2 | | 16.7 | | 15.2 | | 11.6 |
| Potential G + D + A | | 106.1 | | 109.9 | | 112.1 | | 112.4 | | 109.2 | | 107.0 |
| Potential G + A | | 57.7 | | 74.4 | | 67.9 | | 65.9 | | 63.1 | | 58.8 |
| G + D | | 86.9 | | 69.0 | | 81.8 | | 82.1 | | 83.9 | | 87.3 |
| C₅⁺ Gaoline Analysis | | | | | | | | | | | | |
| RON + O | | 92.4 | | 94.3 | | 94.4 | | 93.8 | | 93.7 | | 92.5 |

[1] 0.2-0.5 micron crystallite size

As can be seen, the silver ZSM-5 maintained its activity for a larger portion of time.

EXAMPLE 5

To investigate the role of silver in fixed-fluidized bed bench unit, HZSM-5 and AgHZSM-5 additive catalyst (0.2-0.5 microns crystallite size), both fresh and steamed were evaluated. Results are given in Tables 4 and 5 for the fresh additive catalysts which are the same as those used in the pilot plant study (see Tables 2 and 3). While the data indicates a slightly greater initial activity for the fresh AgHZSM-5, no significant change in product distribution is observed. When compared at a constant 60 vol percent conversion (Table 6) fresh HZSM-5A and AgHZSM-5A yield equivalent octane gains and product distributions, indicating no inherent selectivity change with silver addition. The comparison of steamed HZSM-5 and AgHZSM-5 are given in Tables 8 and 9, respectively, indicating greater hydrothermal stability for AgHZSM-5 and excellent agreement with the results of Tables 2 and 3.

TABLE 4

Comparison[1] of Fresh HZSM-5[2] and AgHZSM-5[2] in Equilibrium HEZ-53 at Constant 3.0 Cat/Oil (20 WHSV hr$^{-1}$)

|  | Equil. HEZ-53 | +0.25% Fresh HZSM-5[2] | +0.25% Fresh AgHZSM-5[2] |
|---|---|---|---|
| Conversion, % Vol | 50.2 | 51.6 | 54.4 |
| Product Yields: | | | |
| $C_5^+$ Gasoline, % vol | 35.7 | 35.8 | 35.8 |
| Total $C_4$'s, % vol | 8.0 | 12.3 | 15.6 |
| Dry Gas, % wt | 4.8 | 9.6 | 9.9 |
| Coke, % wt | 3.1 | 3.3 | 3.0 |
| LFO, % wt | 39.3 | 36.7 | 35.8 |
| HFO, % wt | 12.0 | 13.0 | 11.6 |
| G + D, % wt | 75.0 | 66.2 | 65.4 |
| n-$C_4$, % vol | 0.9 | 1.1 | 1.0 |
| i-$C_4$, % vol | 2.5 | 3.4 | 4.3 |
| $C_4^=$, % vol | 4.6 | 7.8 | 10.3 |
| $C_3$, % vol | 0.7 | 1.4 | 1.5 |
| $C_3^=$, % vol | 4.4 | 11.9 | 12.1 |
| Potential Alkylate Yields: | | | |
| Alkylate, % vol | 15.1 | 32.7 | 37.1 |
| $C_5^+$ Gasoline + Alkylate, % vol | 58.3 | 68.6 | 72.9 |
| Outside i-$C_4$, % vol | 7.8 | 19.0 | 21.0 |
| Octane Number RON + O: | | | |
| $C_5^+$ Gasoline | 87.4 | 91.1 | 91.5 |
| $C_5^+$ Gasoline + Alkylate | 89.2 | 92.3 | 92.7 |

[1]Fixed-Fluidized Bed Bench Unit, 1.0 Minute On-Stream. Reaction Temperature: 960° F.; Feed: JSHGO
[2]0.2-0.5 micron crystallite size

TABLE 5

Comparison[1] of Fresh HZSM-5[2] and AgHZSM-5[2] in Equilibrium HEZ-53 at Constant 5.0 Cat/Oil (12 WHSV hr$^{-1}$)

|  | Equil. HEZ-53 | +0.25% Fresh HZSM-5[2] | +0.25% Fresh AgHZSM-5[2] |
|---|---|---|---|
| Conversion, % Vol | 65.5 | 67.4 | 67.5 |
| Product Yields: | | | |
| $C_5^+$ Gasoline, % vol | 53.6 | 40.3 | 38.7 |
| Total $C_4$'s, % vol | 11.8 | 18.6 | 20.4 |
| Dry Gas, % wt | 7.2 | 14.6 | 14. |
| Coke, % wt | 4.5 | 5.0 | 5.5 |
| LFO, % wt | 29.8 | 29.1 | 28.7 |
| HFO, % wt | 7.1 | 6.1 | 6.4 |
| G + D, % wt | 73.8 | 62.4 | 61.0 |
| n-$C_4$, % vol | 1.1 | 1.2 | 1.9 |
| i-$C_4$, % vol | 4.6 | 7.8 | 7.7 |
| $C_4^=$, % vol | 6.0 | 9.6 | 10.8 |
| $C_3$, % vol | 1.6 | 3.4 | 3.0 |
| $C_3^=$, % vol | 6.4 | 16.5 | 16.8 |
| Potential Alkylate Yields: | | | |
| Alkylate, % vol | 20.7 | 43.2 | 45.7 |
| $C_5^+$ Gasoline + Alkylate, % vol | 74.3 | 83.5 | 84.5 |
| Outside i-$C_4$, % vol | 9.5 | 21.8 | 23.6 |
| Octane Number RON + O: | | | |
| $C_5^+$ Gasoline | 89.5 | 92.2 | 92.2 |

TABLE 5-continued

Comparison[1] of Fresh HZSM-5[2] and AgHZSM-5[2] in Equilibrium HEZ-53 at Constant 5.0 Cat/Oil (12 WHSV hr$^{-1}$)

|  | Equil. HEZ-53 | +0.25% Fresh HZSM-5[2] | +0.25% Fresh AgHZSM-5[2] |
|---|---|---|---|
| $C_5^+$ Gasoline + Alkylate | 90.8 | 92.9 | 93.0 |

[1]Fixed-Fluidized Bed Bench Unit, 1.0 Minute On-Stream. Reaction Temperature: 960° F.; Feed: JSHGO
[2]0.2-0.5 micron crystallite size

TABLE 6

Comparison[1] of Fresh HZSM-5[2] and AgHZSM-5[2] in Equilibrium HEZ-53 at Constant 60 vol % Conversion

|  | Equil. HEZ-53 | +0.25% Fresh HZSM-5[2] | +0.25% Fresh AgHZSM-5[2] |
|---|---|---|---|
| Conversion, % Vol | 60.0 | 60.0 | 60.0 |
| Product Yields: | | | |
| $C_5^+$ Gasoline, % vol | 49.4 | 39.5 | 39.3 |
| Total $C_4$', % vol | 11.3 | 17.4 | 16.6 |
| Dry Gas, % wt | 6.2 | 11.6 | 11.8 |
| Coke, % wt | 3.8 | 4.0 | 3.3 |
| LFO, % wt | 33.5 | 32.4 | 33.0 |
| HFO, % wt | 8.5 | 9.1 | 9.2 |
| G + D, % wt | 74.2 | 65.0 | 65.1 |
| n-$C_4$, % vol | 1.1 | 1.2 | 1.4 |
| i-$C_4$, % vol | 3.9 | 5.7 | 4.6 |
| $C_4^=$, % vol | 6.3 | 10.5 | 10.6 |
| $C_3$, % vol | 1.1 | 2.1 | 1.7 |
| $C_3^=$, % vol | 5.7 | 13.7 | 14.3 |
| Potential Alkylate Yields: | | | |
| Alkylate, % vol | 20.1 | 40.1 | 41.4 |
| $C_5^+$ Gasoline + Alkylate, % vol | 69.5 | 79.5 | 80.4 |
| Outside i-$C_4$, % vol | 9.7 | 21.6 | 23.7 |
| Octane Number RON + O: | | | |
| $C_5^+$ Gasoline | 88.7 | 92.0 | 91.9 |
| $C_5^+$ Gasoline + Alkylate | 90.2 | 92.8 | 92.8 |

[1]Fixed-Fluidized Bed Bench Unit, 1.0 Minute On-Stream. Reaction Temperature: 960° F.; Feed: JSHGO
[2]0.2-0.5 micron crystallite size

TABLE 7

Comparison[1] of Steamed[2] HZSM-5[3] and AgHZSM-5[3] in Equilibrium HEZ-53 at Constant 3.0 Cat/Oil (20 WHSV hr$^{-1}$)

|  | Equil. HEZ-53 | +2% Stm'd HZSM-5[3] | +2% Stm'd AgHZSM-5[3] |
|---|---|---|---|
| Conversion, % Vol | 50.2 | 50.7 | 52.3 |
| Product Yields: | | | |
| $C_5^+$ Gasoline, % vol | 35.7 | 35.4 | 32.6 |
| Total $C_4$'s, % vol | 8.0 | 9.9 | 11.8 |
| Dry Gas, % wt | 4.8 | 5.5 | 7.4 |
| Coke, % wt | 3.1 | 2.7 | 3.1 |
| LFO, % wt | 39.3 | 38.0 | 37.1 |
| HFO, % wt | 12.0 | 11.9 | 12.3 |
| G + D, % wt | 75.0 | 73.4 | 69.6 |
| n-$C_4$, % vol | 0.9 | 0.9 | 1.0 |
| i-$C_4$, % vol | 2.5 | 2.6 | 2.9 |
| $C_4^=$, % vol | 4.6 | 6.4 | 7.9 |
| $C_3$, % vol | 0.7 | 0.7 | 0.8 |
| $C_3^=$, % vol | 4.4 | 5.5 | 8.3 |
| Potential Alkylate Yields: | | | |
| Alkylate, % vol | 15.1 | 19.8 | 27.0 |
| $C_5^+$ Gasoline + Alkylate, % vol | 58.3 | 62.8 | 66.6 |
| Outside i-$C_4$, % vol | 7.8 | 10.8 | 15.4 |
| Octane Number RON + O: | | | |
| $C_5^+$ Gasoline | 87.4 | 89.4 | 92.4 |

TABLE 7-continued

Comparison[1] of Steamed[2] HZSM-5[3] and AgHZSM-5[3] in Equilibrium HEZ-53 at Constant 3.0 Cat/Oil (20 WHSV hr$^{-1}$)

|  | Equil. HEZ-53 | +2% Stm'd HZSM-5[3] | +2% Stm'd AgHZSM-5[3] |
|---|---|---|---|
| $C_5^+$ Gasoline + Alkylate | 89.2 | 90.9 | 93.1 |

[1]Fixed-Fluidized Bed Bench Unit, 1.0 Minute On-Stream. Reaction Temperature: 960° F.; Feed: JSHGO
[2]Steamed 10 hrs, 1450° F., 45/55 steam/air, 0 psig
[3]0.2–0.5 micron crystallite size

TABLE 8

Comparison[1] of Steamed[2] HZSM-5[3] and AgHZSM-5[3] in Equilibrium HEZ-53 at Constant 4.0 Cat/Oil (15 WHSV hr$^{-1}$)

|  | Equil. HEZ-53 | +2% Stm'd HZSM-5[3] | +2% Stm'd AgHZSM-5[3] |
|---|---|---|---|
| Conversion, % Vol | 59.8 | 58.4 | 59.8 |
| Product Yields: |  |  |  |
| $C_5^+$ Gasoline, % vol | 49.1 | 46.7 | 43.3 |
| Total $C_4$'s, % vol | 11.3 | 12.5 | 13.9 |
| Dry Gas, % wt | 6.1 | 6.5 | 9.1 |
| Coke, % wt | 3.7 | 3.7 | 4.0 |
| LFO, % wt | 35.1 | 35.2 | 33.9 |
| HFO, % wt | 7.3 | 8.2 | 8.4 |
| G+ D, % wt | 75.6 | 73.5 | 69.6 |
| n-$C_4$, % vol | 1.0 | 1.0 | 1.2 |
| i-$C_4$, % vol | 4.0 | 4.0 | 3.8 |
| $C_4^=$, % vol | 6.4 | 7.5 | 8.8 |
| $C_3$, % vol | 1.1 | 1.0 | 1.1 |
| $C_3^=$, % vol | 5.6 | 6.8 | 10.6 |
| Potential Alkylate Yields: |  |  |  |
| Alkylate, % vol | 20.1 | 23.9 | 32.3 |
| $C_5^+$ Gasoline + Alkylate, % vol | 69.1 | 70.6 | 75.6 |
| Outside i-$C_4$, % vol | 9.6 | 12.1 | 18.2 |
| Octane Number RON + O: |  |  |  |
| $C_5^+$ Gasoline | 88.4 | 89.8 | 91.5 |
| $C_5^+$ Gasoline + Alkylate | 90.1 | 91.3 | 92.5 |

[1]Fixed-Fluidized Bed Bench Unit, 1.0 Minute On-Stream. Reaction Temperature: 960° .F; Feed: JSHGO
[2]Steamed 10 hrs, 1450° F., 45/55 steam/air, 0 psig
[3]0.2–0.5 micron crystallite size

EXAMPLES 6-9

The following examples will illustrate that the method of incorporating silver into the ZSM-5 is not critical.

Three different methods of incorporating silver are as follows:

Procedure 1 a. ZSM-5 Synthesis + Washing
b. ZSM-5 Treatment
   $N_2$ Precalcination
   $NH_4NO_3$ Exchange
   Air Calcination
   $AgNO_3$ Exchange
c. Matrix Formation (93/7 $SiO_2/Al_2O_3$)
d. Zeolite Incorporation
e. Spray Drying
f. Base Exchange—$Al_2(SO_4)_3$
g. Catalyst Drying

Procedure 2

This procedure differs from procedure 1 in steps b. and f. only. In step b. the as-synthesized ZSM-5 is exchanged with $AgNO_3$ at elevated temperatures (140°–160° F.). There is no $N_2$ precalcination, $NH_4NO_3$ exchange of air calcination. In step f. the base exchange is accomplished using an aqueous solution of 1% $Al_2(SO_4)_3$ and 9.5% $NH_4Cl$.

Procedure 3

In this procedure step b. of procedure is eliminated and the silver is added by impregnating the base exchanged wetcake with a 0.075N $AgNO_3$ solution. A 5% $(NH_4)_2SO_4$ solution was used in the base exchange, step f. To yield 0.2 wt percent Ag on catalyst, 30.0 cc of $AgNO_3$ solution is used to impregnate 120 gm of catalyst wetcake (41% solids). The silver content can be adjusted by varying the $AgNO_3$ solution concentration or the quantity of impregnating solution. This procedure has a significant advantage over the other two methods in that there is no base exchange of the catalyst following silver addition. In both procedures 1 and 2 substantial silver losses (80%) resulted from step f.

A comparison of AgHZSM-5 (crystallite size 0.02–0.05 microns) prepared by procedures 1 and 2 is given for the fresh and steamed additives in Tables 9 and 10, respectively. The results indicate nearly identical octanes and yields. The AgHZSM-5 catalyst prepared by procedure 1 is the exact additive catalyst which was evaluated previously in Example 1.

The effect of AgHZSM-5 (0.2–0.5 microns) prepared by procedures 2 and 3 is given for fresh and steamed additives in Tables 11 and 12, respectively. The data indicate that procedures 2 and 3 yield equivalent octanes and product yields and that the silver content is not critical over the range 0.12–0.28 wt percent on final catalyst when employing procedure 2. A comparison of Tables 10 and 12 once again demonstrates the greater hydrothermal stability of the larger crystal size ZSM-5.

TABLE 9

Comparison[1] of Fresh AgHZSM-5[2] Additive Catalysts in Super-D[3] at Constant 3.0 Cat/Oil (20 WHSV hr$^{-1}$)

|  | Super-D | +.25% Fresh AgHZSM-5[2] | |
|---|---|---|---|
| Method of silver Incorporation | — | Procedure 1 | Procedure 2 |
| Silver Content, wt %: | — | 1.3 | 0.9 |
| Parent ZSM-5 Final Catalyst | — | 0.09 | 0.06 |
| Conversion, % Vol | 67.2 | 68.6 | 67.8 |
| Product Yields: |  |  |  |
| $C_5^+$ Gasoline, % vol | 54.8 | 48.9 | 47.9 |
| Total $C_4$'s, % vol | 14.1 | 18.9 | 18.5 |
| Dry Gas, % wt | 7.1 | 9.2 | 9.2 |
| Coke, % wt | 3.5 | 4.4 | 4.4 |
| LFO, % wt | 27.5 | 27.8 | 27.8 |
| HFO, % wt | 8.0 | 6.5 | 7.3 |
| G + D, % wt | 72.4 | 67.8 | 67.0 |
| n-$C_4$, % vol | 1.8 | 2.2 | 1.8 |
| i-$C_4$, % vol | 6.3 | 8.7 | 9.0 |
| $C_4^=$, % vol | 6.0 | 8.0 | 7.7 |
| $C_3$, % vol | 2.1 | 2.7 | 2.7 |
| $C_3^=$, % vol | 6.6 | 9.8 | 10.0 |
| Potential Alkylate Yields: |  |  |  |
| Alkylate, % vol | 21.0 | 29.7 | 29.3 |
| $C_5^+$ Gasoline + Alkylate % vol | 75.8 | 78.5 | 77.3 |
| Outside i-$C_4$, % vol | 8.0 | 11.7 | 11.1 |
| Octane Number RON + O: |  |  |  |
| $C_5^+$ Gasoline | 87.2 | 88.6 | 88.8 |
| $C_5^+$ Gasoline + Alkylate | 89.1 | 90.6 | 90.7 |

[1]Fixed-Fluidized Bed Bench Unit, 1.0 Minute On-Stream. Reaction Temperature: 960° F.; Feed: JSHGO
[2]0.02–0.05 micron crystallite size
[3]Steamed 10 hrs, 1450° F., 45/55 Steam/air, 0 psig

TABLE 10

Comparison[1] of Steamed[2] AgHZSM-5[3] Additive Catalysts in Super-D[2], at Constant 3.0 Cat/Oil (20 WHSV hr$^{-1}$)

|  | Super-D | +2% Steamed AgHZSM-5[3] | |
|---|---|---|---|
| Method of silver Incorporation | — | Procedure 1 | Procedure 2 |
| Silver Content, wt %: |  |  |  |
| Parent ZSM-5 | — | 1.3 | 1.3 |
| Final Catalyst | — | 0.09 | 0.06 |
| Conversion, % vol | 67.2 | 68.3 | 68.1 |
| Product Yields: |  |  |  |
| $C_5^+$ Gasoline, % vol | 54.8 | 52.6 | 52.2 |
| Total $C_4$'s % vol | 14.1 | 16.5 | 15.4 |
| Dry Gas, % wt | 7.1 | 8.0 | 8.7 |
| Coke, % wt | 3.5 | 3.8 | 3.8 |
| LFO, % wt | 27.5 | 27.6 | 27.9 |
| HFO, % wt | 8.0 | 7.0 | 6.9 |
| G + D, % wt | 72.4 | 70.7 | 70.7 |
| n-$C_4$, % vol | 1.8 | 2.1 | 2.2 |
| i-$C_4$, % vol | 6.3 | 7.2 | 6.7 |
| $C_4^=$, % vol | 6.0 | 7.2 | 6.6 |
| $C_3$, % vol | 2.1 | 2.2 | 2.2 |
| $C_3^=$, % vol | 6.6 | 7.6 | 8.4 |
| Potential Alkylate Yields: |  |  |  |
| Alkylate % vol | 21.0 | 24.7 | 24.9 |
| $C_5^+$ Gasoline + Alkylate, % vol | 75.8 | 77.2 | 77.1 |
| Outside i-$C_4$, % vol | 8.0 | 9.6 | 10.4 |
| Octane Number RON + O: |  |  |  |
| $C_5^+$ Gasoline | 87.2 | 87.7 | 87.9 |
| $C_5^+$ Gasoline + Alkylate | 89.1 | 89.7 | 89.8 |

[1] Fixed-Fluidized Bed Bench Unit, 1.0 Minute On-Stream. Reaction Temperature: 960° F.; Feed: JSHGO
[2] Steamed 10 hrs. 1450° F., 45/55 steam/air, 0 psig
[3] 0.02–0.05 micron crystallite size

TABLE 11

Comparison[1] of Fresh AgHZSM-5[2] Additive Catalysts in Super-D[3], at Constant 3.0 Cat/Oil (20 WHSV hr$^{-1}$)

|  | Super-D | +0.25% Fresh AgHZSM-5[2] | | | |
|---|---|---|---|---|---|
| Method of silver Incorporation | — | Procedure 2 | Procedure 2 | Procedure 2 | Procedure 3 |
| Silver Content, wt %: |  |  |  |  |  |
| Parent ZSM-5 | — | 0.9 | 1.8 | 2.8 | — |
| Final Catalyst | — | 0.12 | 0.13 | 0.28 | 0.20 |
| Conversion, % Vol | 67.2 | 70.7 | 69.7 | 68.7 | 65.7 |
| Product Yields: |  |  |  |  |  |
| $C_5^+$ Gasoline, % vol | 54.8 | 49.3 | 48.7 | 47.7 | 46.3 |
| Total $C_4$'s, % vol | 14.1 | 21.5 | 20.5 | 21.2 | 20.2 |
| Dry Gas, % wt | 7.1 | 9.4 | 9.3 | 8.6 | 8.7 |
| Coke, % wt | 3.5 | 4.3 | 4.7 | 4.8 | 3.4 |
| LFO, % wt | 27.5 | 26.2 | 26.4 | 27.3 | 27.4 |
| HFO, % wt | 8.0 | 6.2 | 6.8 | 6.8 | 9.8 |
| G + D, % wt | 72.4 | 66.5 | 66.2 | 66.4 | 65.3 |
| n-$C_4$, % vol | 1.8 | 2.2 | 1.9 | 2.3 | 2.1 |
| i-$C_4$, % vol | 6.3 | 10.4 | 10.3 | 10.4 | 9.0 |
| $C_4^=$, % vol | 6.0 | 8.9 | 8.2 | 8.5 | 9.1 |
| $C_3$, % vol | 2.1 | 3.1 | 2.9 | 2.6 | 2.2 |
| $C_3^=$, % vol | 6.6 | 9.5 | 9.2 | 8.4 | 9.3 |
| Potential Alkylate Yields: |  |  |  |  |  |
| Alkylate, % vol | 21.0 | 30.6 | 29.0 | 28.2 | 30.7 |
| $C_5^+$ Gasoline + Alkylate, % vol | 75.8 | 79.9 | 77.7 | 75.9 | 77.0 |
| Outside i-$C_4$, % vol | 8.0 | 10.4 | 9.5 | 8.8 | 11.9 |
| Octane Number RON + O: |  |  |  |  |  |
| $C_5^+$ Gasoline | 87.2 | 90.3 | 89.5 | 89.4 | 90.3 |
| $C_5^+$ Gasoline + Alkylate | 89.1 | 91.7 | 91.2 | 91.1 | 91.8 |

[1] Fixed-Fluidized Bed Bench Unit, 1.0 Minute On-Stream. Reaction Temperature: 960° F.; Feed: JSHGO
[2] 0.2–0.5 micron crystallite size
[3] Steamed 10 hrs., 1450° F., 45/55 steam/air, 0 psig

TABLE 12

Comparison[1] of Steamed[2] AgHZSM-5[3] Additive Catalysts in Super-D[2] at Constant 3.0 Cat/Oil (20 WHSV hr$^{-1}$)

|  | Super-D | 2% Steamed AgHZSM-5[3] | | | |
|---|---|---|---|---|---|
| Method of silver Incorporation | — | Procedure 2 | Procedure 2 | Procedure 2 | Procedure 3 |
| Silver Content, wt %: |  |  |  |  |  |
| Parent ZSM-5 | — | 0.9 | 1.8 | 2.8 | — |
| Final Catalyst | — | 0.12 | 0.13 | 0.28 | 0.2 |
| Conversion, % Vol | 67.2 | 69.0 | 67.9 | 69.2 | 65.0 |
| Product Yields: |  |  |  |  |  |
| $C_5^+$ Gasoline, % vol | 54.8 | 51.5 | 53.4 | 52.9 | 51.4 |

TABLE 12-continued

Comparison[1] of Steamed[2] AgHZSM-5[3] Additive Catalysts in Super-D[2] at Constant 3.0 Cat/Oil (20 WHSV hr$^{-1}$)

|  | Super-D | | 2% Steamed AgHZSM-5[3] | | |
|---|---|---|---|---|---|
| Total C$_4$'s, % vol | 14.1 | 16.9 | 16.6 | 16.2 | 15.4 |
| Dry Gas, % wt | 7.1 | 8.9 | 7.4 | 8.5 | 7.6 |
| Coke, % wt | 3.5 | 4.5 | 3.8 | 4.4 | 3.1 |
| LFO, % wt | 27.5 | 26.9 | 26.8 | 26.7 | 27.5 |
| HFO, % wt | 8.0 | 6.9 | 8.0 | 7.0 | 10.3 |
| G + D, % wt | 72.4 | 69.0 | 70.2 | 69.8 | 69.3 |
| n-C$_4$, % vol | 1.8 | 2.0 | 2.0 | 2.0 | 1.7 |
| i-C$_4$, % vol | 6.3 | 7.7 | 7.4 | 7.1 | 6.6 |
| C$_4^=$, % vol | 6.0 | 7.1 | 7.2 | 7.2 | 7.1 |
| C$_3$, % vol | 2.1 | 2.7 | 2.1 | 2.6 | 2.0 |
| C$_3^=$, % vol | 6.6 | 8.4 | 7.0 | 8.0 | 7.6 |
| Potential Alkylate Yields: | | | | | |
| Alkylate, % vol | 21.0 | 25.9 | 23.8 | 25.2 | 24.4 |
| C$_5^+$ Gasoline + Alkylate, % vol | 75.8 | 77.4 | 77.2 | 78.1 | 75.8 |
| Outside i-C$_4$, % vol | 8.0 | 10.0 | 8.8 | 10.1 | 10.1 |
| Octane Number RON + O: | | | | | |
| C$_5^+$ Gasoline | 87.2 | 88.9 | 89.0 | 89.1 | 89.1 |
| C$_5^+$ Gasoline + Alkylate | 89.1 | 90.6 | 90.6 | 90.6 | 90.7 |

[1] Fixed-Fluidized Bed Bench Unit, 1.0 Minute On-Stream. Reaction Temperature: 960° F.; Feed: JSHGO
[2] Steamed 10 hrs, 1450° F., 45/55 steam/air, 0 psig
[3] S0.2–0.5 micron crystallite size The JSHGO feed utilized in the examples had the properties set forth below:

TABLE 13

| Chargestock | Joliet Sour Heavy Gas Oil (JSHGO) |
|---|---|
| Gravity, °API | 24.3 |
| Aniline Pt., °F. | 171 |
| Sulfur, wt. percent | 1.87 |
| Nitrogen, wt. percent | 0.10 |
| Basic Nitrogen, ppm | 327 |
| Conradson Carbon, wt. % | 0.28 |
| Viscosity, KV at 210° F. | 3.6 |
| Bromine No. | 4.2 |
| R.I. at 70° F. | 1.5080 |
| Hydrogen, wt. percent | 12.3 |
| Molecular Weight | 358 |
| Pour Point, °F. | 85 |
| Paraffins, wt. percent | 23.5 |
| Naphthenes, wt. percent | 32.0 |
| Aromatics, wt. percent | 44.5 |
| CA, wt. percent | 18.9 |

What is claimed is:

1. In a process for catalytic cracking of a petroleum fraction having an initial boiling point of at least 400° F., a 50 percent boiling range of at least 500° F. and an end point range of at least 600° F. to produce motor fuels wherein said petroleum fraction is contacted at elevated temperatures of about 400° to about 1300° F. in the presence of a conventional cracking catalyst selected from a large pore size crystalline zeolite, silica-alumina, clays and mixtures thereof in admixture with an additive catalyst comprising a zeolite component characterized by a constraint index of about 1–12 and a silica to alumina mole ratio greater than about 12, said additive catalyst being subjected to hydrothermal deactivation, the improvement wherein said zeolite component contains about 0.05 to about 5 weight percent silver based on said zeolite component.

2. The process of claim 1 wherein said silver is present in about 1 percent by weight of said zeolite component.

3. The process of claim 1 wherein said zeolite component is added in an amount which provides the zeolite component of said additive catalyst at from about 1 to about 50 wt percent of the conventional cracking catalyst in the cracking process.

4. The process of claim 3 wherein said zeolite component is at least one member selected from the group consisting of ZSM-5, ZSM-11, ZSM-12, ZSM-23, ZSM-35, ZSM-38 and ZSM-48.

5. The process of claim 4 wherein said zeolite component of said additive catalyst is ZSM-5.

6. The process of claim 1 wherein said crystalline zeolite of said conventional cracking catalyst is selected from the group consisting of zeolite X and zeolite Y.

7. The process of claim 6 wherein said crystalline zeolite of said conventional cracking catalyst is zeolite Y.

8. The process of claim 1 wherein the catalytic cracking takes place in fluid catalytic cracking process.

9. The process of claim 1 wherein catalytic cracking takes place in a moving bed catalytic cracking process.

10. The process of claim 1 wherein said zeolite component of the additive catalyst is incorporated in a matrix.

11. The process of claim 1 wherein at least one metal selected from the group consisting of platinum, palladium, iridium, osmium, rhodium, ruthenium and rhenium is added to the conventional cracking catalyst or to said zeolite component in order to enhance carbon monoxide conversion.

12. The process of claim 1 wherein said zeolite component is mixed with said conventional cracking catalyst during an on-stream operation of the cracking process.

13. The process of claim 4 wherein said additive catalyst and said conventional cracking catalyst are mixed in a single particle.

14. In a process for catalytic cracking of a petroleum fraction having an initial boiling point of at least 400° F., a 50 percent boiling range of at least 500° F. and an end point range of at least 600° F. to produce motor fuels wherein said petroleum fraction is contacted at elevated temperatures of about 400° to about 1300° F. in the presence of a cracking catalyst comprising zeolite Y in admixture with an additive catalyst comprising a zeolite component characterized by a constraint index of about 1-12 and silica to alumina mole ratio greater than about 12, the improvement wherein said zeolite component contains about 0.05 to about 5 weight percent silver based on said zeolite component.

15. The process of claim 14 in which the zeolite Y cracking catalyst comprises zeolite Y in the ultrastable form.

* * * * *